United States Patent
Zemany et al.

(10) Patent No.: US 7,460,052 B2
(45) Date of Patent: *Dec. 2, 2008

(54) MULTIPLE FREQUENCY THROUGH-THE-WALL MOTION DETECTION AND RANGING USING A DIFFERENCE-BASED ESTIMATION TECHNIQUE

(75) Inventors: Paul D. Zemany, Amherst, NH (US); Eldon M. Sutphin, Merrimack, NH (US)

(73) Assignee: BAE Systems Information And Electronic Systems Integration Inc., Nashua, NH (US)

( * ) Notice: Subject to any disclaimer, the term of this patent is extended or adjusted under 35 U.S.C. 154(b) by 6 days.

This patent is subject to a terminal disclaimer.

(21) Appl. No.: 10/589,322

(22) PCT Filed: Nov. 2, 2004

(86) PCT No.: PCT/US2004/036446

§ 371 (c)(1),
(2), (4) Date: Aug. 14, 2006

(87) PCT Pub. No.: WO2005/104417

PCT Pub. Date: Nov. 3, 2005

(65) Prior Publication Data

US 2007/0024487 A1    Feb. 1, 2007

Related U.S. Application Data

(60) Provisional application No. 60/537,868, filed on Jan. 20, 2004.

(51) Int. Cl.
*G01S 13/50* (2006.01)
*G01S 13/62* (2006.01)

(52) U.S. Cl. .................. 342/22; 342/192; 342/127; 342/129; 342/28

(58) Field of Classification Search ................ 342/22, 342/192, 127, 129, 28
See application file for complete search history.

(56) References Cited

U.S. PATENT DOCUMENTS 4,024,540 A    5/1977    Ofverberg (Continued)

FOREIGN PATENT DOCUMENTS

EP    0 849 607    6/1998

(Continued)

*Primary Examiner*—Dan Pihulic
(74) *Attorney, Agent, or Firm*—Robert K. Tendler

(57) ABSTRACT

A multi-tone CW radar (14) is used to project signals from an antenna (22) and to receive returns with the same antenna. The phase differences between the outgoing signals and the returns are analyzed to determine the existence of motion and the range to a moving object (10). A model is made which has range as its major parameter. A waveform associated with the phase difference between outgoing signals and returns for one of the tones is compared to templates produced by the model to determine which has a range that most closely matches. By varying the range parameters, when a match is detected the range to the object can be obtained even if its motion is pseudorandom. If the range is measured with multiple units it is possible to measure the location of the object. This can be done assuming a grid and algorithmically combining the ranges from the units.

14 Claims, 4 Drawing Sheets

U.S. PATENT DOCUMENTS

| | | |
|---|---|---|
| 5,963,163 A | 10/1999 | Kemkemian et al. |
| 6,380,882 B1 | 4/2002 | Hegnauer |
| 6,747,488 B2 * | 6/2004 | Nagaishi et al. ............. 327/113 |
| 7,307,575 B2 * | 12/2007 | Zemany ....................... 342/22 |
| 7,355,545 B2 * | 4/2008 | Zemany et al. ................ 342/22 |
| 2003/0112142 A1 | 6/2003 | Izumi et al. |
| 2004/0012447 A1 * | 1/2004 | Nagaishi et al. ................ 331/2 |
| 2006/0055585 A1 * | 3/2006 | Nagasaku et al. ............. 342/28 |
| 2006/0250294 A1 * | 11/2006 | Zemany et al. ................ 342/22 |
| 2007/0024487 A1 * | 2/2007 | Zemany et al. ................ 342/22 |
| 2008/0111729 A1 * | 5/2008 | Zemany et al. ................ 342/22 |

FOREIGN PATENT DOCUMENTS

EP　　　　1 253 441　　　10/2002

\* cited by examiner

MULTIPLE FREQUENCY THROUGH-THE-WALL MOTION DETECTION AND RANGING USING A DIFFERENCE-BASED ESTIMATION TECHNIQUE

RELATED APPLICATIONS

This application claims rights under 35 USC § 119(e) from U.S. Provisional Application Ser. No. 60/537,868 filed Jan. 20, 2004, the contents of which are incorporated herein by reference.

FIELD OF THE INVENTION

This invention relates to through-the-wall sensors and more particularly to the use of a two-tone CW radar to detect both motion and range of objects behind a wall.

BACKGROUND OF THE INVENTION

As described in PCT Patent Application PCT/US04/30116 filed Sep. 14, 2004 by Paul Zemany and Eldon Sutphin, a system is described for projecting continuous wave radar energy through a wall to be able to detect motion of persons behind the wall. In the invention described above, motion is detected by a change in the phase difference between the transmitted wave and the received wave, which is indeed sensitive in detecting motion.

However, the use of a single frequency radar does not permit the detection of range to the moving individual and may provide less-than-adequate information to individuals, for instance when trying to detect the whereabouts of a moving individual behind a wall.

As described in the afore-mentioned patent application by Zemany and Sutphin, detecting motion behind a wall is extremely useful in both civilian and military applications. For instance, locating the whereabouts of a down firefighter in a burning building is of consequence for firefighters, whereas detecting the position of an individual behind a wall may be of significant interest to military forces seeking to capture or remove the individual from being a threat.

Moreover, knowing not only that the motion has occurred but also range, one can estimate what it will take to provide personnel to rescue, for instance, an individual within a burning building. Range also is important to be able to ascertain where a wanted individual is so that the individual can be captured. By using two units capable of providing range, it is then possible to provide the location of the individual.

It will be appreciated that in the past, ultra wideband devices have been used as ground-penetrating and through-the-wall radars. The difficulty with ultra wideband approaches is that one has to generate short pulses, which requires fairly expensive hardware. A particular difficulty with ultra wideband is that walls have frequency-dependent attenuation. This results in a distortion of the return pulses that pass through the wall. This distortion blurs the pulse, making it hard to correlate. Moreover, in ultra wideband applications, one must integrate over multiple pulses in order to obtain enough processing gain to detect objects inside a building. In this regard, in ultra wideband systems, one has to generate a stream of pulses. The problem with generating streams of pulses is the existence of clutter and with an ultra wideband pulsed radar, one detects everything within a room. One therefore has to have a means for discriminating clutter from background, which ultra wideband systems do not do.

What is therefore required is an easily portable, low cost, low power drain, compact unit that can be positioned outside a building and that can detect motion of individuals within the building, discriminate against inanimate objects and at the same time provide range to the detected moving object.

SUMMARY OF INVENTION

In order to detect range as well as the existence of motion, in the subject invention a multi-tone CW radar is used in which the frequency difference between the tones in one embodiment is on the order of one MHz. Thus the tones are one MHz apart.

It is a finding of the subject invention that, for an object exhibiting constant motion or velocity, the phase shift between the two waveforms representing the phase difference between transmitted and returned waves for the two tones or frequencies is directly related to range. This is because comparing waveforms corresponding to the phase difference between the outgoing and incoming waves at the two frequencies results in a relationship between the phase shift between the two waveforms and range. For instance, at zero range there is no difference in phase between the two waveforms. At a range equal to $\lambda/4$ one has a 180° phase shift between the two waveforms. In between, for constant motion objects there is a linear relationship between phase shift and range such that by measuring phase shift between the two waveforms one can deduce range. Here $\lambda$ is the wavelength associated with the difference in $f_1$ and $f_2$, or in this case one megahertz.

However, in reality individuals rarely maintain a constant velocity and it can be shown that the subject system can measure range to objects having a pseudo-random motion.

In order to determine range for random motion, the two-tone CW radar used for constant motion is used to drive a single antenna. Here continuous waves at the two frequencies $f_1$ and $f_2$ are simultaneously applied to the antenna. The system measures the phase difference between the returned versus transmitted energy for the first tone, $f_1$ and the second tone, $f_2$. This results in two waveforms each specifying the temporal phase difference for the two respective tones. In the constant motion case, the phase shift between these two waveforms indicates the range from the antenna to the moving object.

In order to accommodate the usual situation in which the object's motion varies over time, a model-based signal processing algorithm extracts range by comparing the waveform corresponding to the time sequence of phase differences for the detected returns at one of the frequencies with the predicted waveforms corresponding to the predicted phase differences for the other frequency at a number of ranges, with the waveform closest to that which is detected being declared as the range to the moving object.

Due to the use of a model-based system, movement is not limited to constant velocity or to large movements compared to the carrier wavelength, meaning that even slight hand movement can be sensed.

The model is populated by selecting the first and second tones and setting their frequencies apart by for instance one MHz. For one frequency, $f_1$, one samples the mixer output used to provide a signal corresponding to the phase difference between outgoing and incoming energy. The output of the mixer thus produces a time sequence waveform corresponding to the phase difference between outgoing and incoming waves at $f_1$. This $\emptyset_{diff}$ $f_1$ waveform is used by a predictor involving a mathematical model that predicts the time sequence waveform for $f_2$ based on information from $f_1$ for an a specific range value. The other input to the predictor is range. The model is built up in terms of generating stored waveform templates by sequencing through a number of ranges to produce a set of range-dependant templates, each keyed to a given range. The time sequence waveform for $f_2$ corresponding to the phase difference between outgoing and incoming waves from real-time data is then compared to the predicted time sequence waveform for $f_2$ to ascertain which template and thus which range offers the best fit. Optimal search methods can be employed to obtain the range value (R) that gives the best fit.

Thus, it is possible to determine range to the motion even if the motion is not constant or the target moves only a fraction of the carrier wavelength For random motion, the system provides not only an indication of the existence of an individual but also determines the range to the individual by first developing range templates or using an iterative search to find the best range value, and by comparing the data associated with real-time returns to the templates, with a matching algorithm determining range.

The range templates in one embodiment are generated by a predictor that predicts from one waveform corresponding to the phase differences for the first tone, namely $f_1$, the predicted phase differences for the second tone.

The predictor algorithm is based on using the time domain signal or temporal waveform corresponding to the temporal phase difference between outgoing and reflected energy at $f_1$ available from a mixer for $f_1$ to predict the temporal phase difference waveform between outgoing and reflected energy at $f_2$ available as a signal produced by a mixer for $f_2$. To describe this the following are defined:

$$k_1 = 2\pi/\lambda_1 \qquad \text{Equation 1}$$

$$k_2 = 2\pi/\lambda_2 = k_1 + \Delta k \qquad \text{Equation 2}$$

The output of the mixer caused by the energy reflected from the moving target is:

$$Y_1(t) = A_1 e^{-ik_1 r(t)/2} \text{ for mixer 1} \qquad \text{Equation 3}$$

$$Y_2(t) = A_2 e^{-ik_2 r(t)/2} \text{ for mixer 2} \qquad \text{Equation 4}$$

$$Y_2(t) = Y_1(t) e^{-i\Delta k r(t)/2} \text{ obtained by substitution} \qquad \text{Equation 5}$$

The above equation predicts waveform $Y_2(t)$ using the difference between $k_1$ and $k_2$ and the range $r(t)$.

Here it can be seen that one can predict the expected temporal phase difference waveform for $f_2$ from the measured phase difference waveform for $f_1$.

By having a predicted waveform for the temporal phase differences of $f_2$, one can compare this waveform with a waveform generated from the measured actual phase differences at $f_2$, Since the predictor generates predicted waveforms at various ranges, when the waveform generated from measured data is compared with one of the predicted waveforms, a match indicates the range to the moving object.

If the comparison results in a significant disparity between the two waveforms, one can adjust the range input to the predictor to generate another predicted waveform for $f_2$. When this newly generated waveform is compared to the waveform associated with measured data, assuming a closer match, the range associated with the newly generated predicted waveform is determined to be the actual range of the moving object.

It will be appreciated that the phase shift between the waveforms replicates at intervals of $\lambda/4$ where in this case $\lambda$ is the wavelength of the difference frequency. In general, a difference between $f_1$ and $f_2$ of one MHz corresponds to a $\lambda$ of about 300 meters. $\lambda/4$ thus corresponds to 75 meters and is termed a "range cell." Returns from moving objects outside of the range cell that would duplicate those inside the range cell can be distinguished in terms of the amplitude of the signals returned from the moving object. Thus a much-decreased amplitude return indicates a moving object in a second or third range cell.

The size of the range cell and thus the resolution of the system is determined by the separation in the two tones. One would normally want to start with a large range cell, in the above example 75 meters, and set the initial range cell by separating the two tones by one MHz, If movement is ascertained within this relatively large range cell, one may subsequently decide to reduce the size of the range cell to increase resolution. If one sees activity in the larger range cell one can, for instance, increase the separation in the two tones to 3 MHz, which makes the range cells one-third the original size.

Having ascertained the range cell that all activity is in, one can increase the resolution of the subject system by increasing the separation between the two tones to decrease the range cell size and thus increase the resolution.

More particularly, this system detects not only motion in a room but also the range of the moving object. One wants to know and locate where in the building the moving object is. If one is able to measure range, this aids in that process of locating individuals in a room or behind a wall.

In order to provide range, the subject system uses two frequencies that are fairly close together, for instance one megahertz apart. One chooses two close frequencies and then looks at the output of each mixer for both frequency 1 and frequency 2. By using a model that describes the differences in the frequency 1 and frequency 2 outputs, one adjusts the range parameter for the model so that when the difference between the model predictions are minimized based on observed data collected, the range that gives the best or closest agreement corresponds to the range of the moving object.

Thus, at a given distance there is a two-way trip that the signal has to travel, with a phase shift between the transmitted and received signals corresponding to that distance. If the distance changes, the phase shift will change. Since each frequency is slightly different, that phase shift will change a little bit differently for the two frequencies. What the system does is to model the two-way trip for each frequency. One frequency shows how the individual is moving in a non-uniform way and one makes a comparison with the motion of the same individual as detected by the second frequency, assuming that both frequencies monitor the same motion. The only parameter left is the range, and by adjusting range, when the range parameters come to the right value, the models for $f_1$ and $f_2$ will match and that range is a good prediction of the range of the moving object.

In summary, a multi-frequency or multi-tone CW radar is used to project radar signals from the same antenna and to receive returns from the same antenna. The phase difference between the outgoing wave and the returns of the two-tone pulses is analyzed to determine both the existence of motion and the range to the moving object from the antenna. In a preferred embodiment a model is made which has range as its major parameter. The waveform associated with the phase difference between outgoing and returns for one of the tones is then compared against the templates produced by the model to determine which model has a range that most closely matches. Using this technique and varying the range parameters, when one detects a match between the two waveforms one can obtain range to a moving object even if its motion is pseudo-random. If range is measured from multiple locations using two or more units, it is possible to measure the location of a moving object. In one embodiment, this is done by assuming a grid within a building. One then algorithmically combines the ranges from various locations. This is done by using the grid and a back-projection algorithm to provide the location of the moving object.

BRIEF DESCRIPTION OF THE DRAWINGS

These and other features of the subject invention will be better understood in connection with a Detailed Description, in conjunction with the Drawings, of which:

FIG. 4 is a waveform diagram for a pseudo-random moving object behind a wall, showing the waveforms for the two tones, namely $f_1$ and $f_2$, at a location intermediate the zero object position of FIG. 2 and the phase reversal object position of FIG. 3, indicating an offset between the two waveforms associated with a location between phase reversal location and the zero position of the pseudo-random moving object;

DETAILED DESCRIPTION

Figure 1:
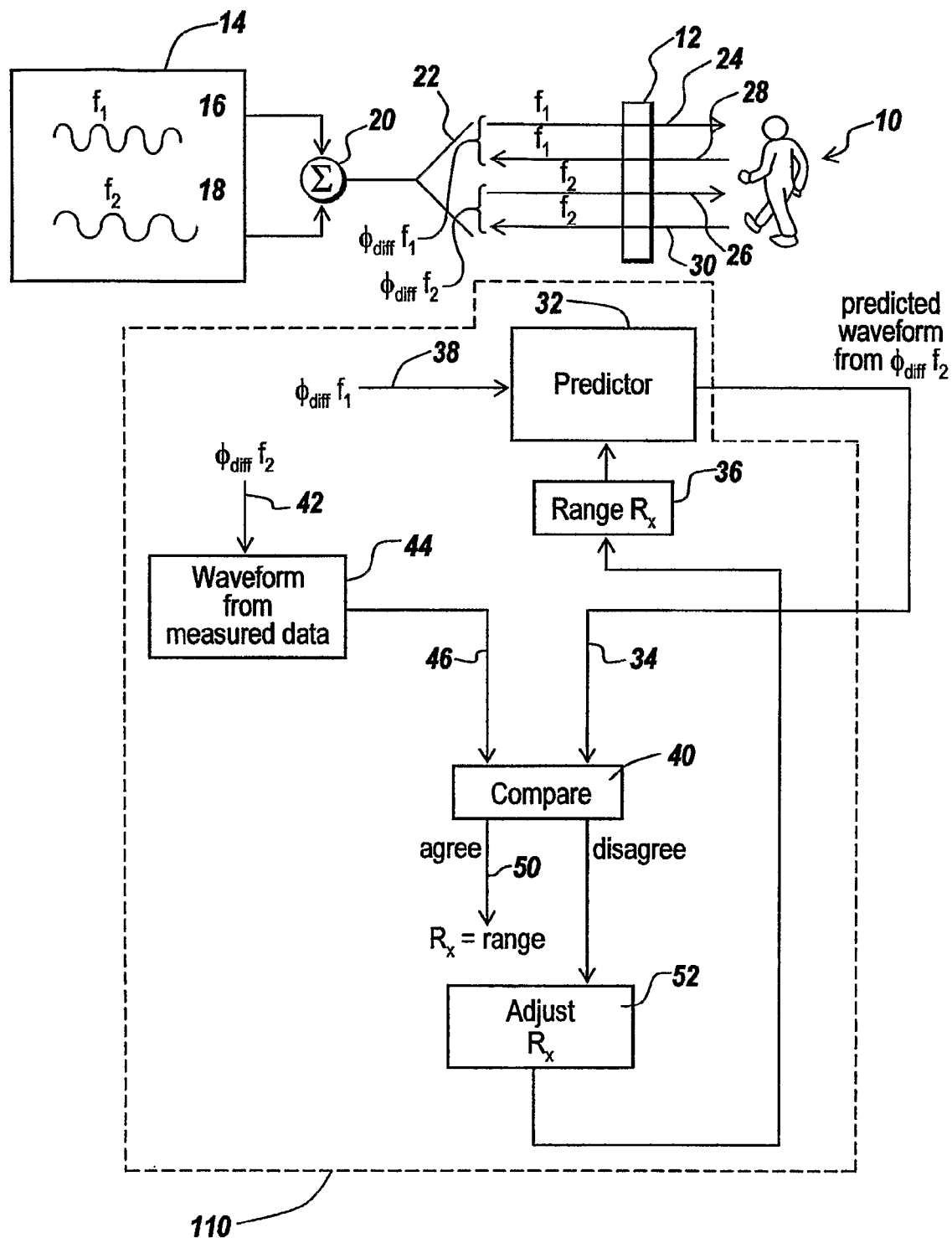
FIG. 1 is a diagrammatic illustration of the subject range detection system in which the range to a moving object behind a wall is detected by projecting two-toned continuous waves through the wall and detecting the phase difference between outgoing and incoming waves for each of the two tones, with the phase difference signal for one frequency being applied to a predictor to generate a predicted waveform for the phase difference of the second of the two tones, with the predicted waveform being compared with a waveform derived from measured data such that when the two waveforms compare favorably, the range associated with the matched waveform is the declared range.

Referring now to FIG. 1, in order to detect the presence of an individual 10 constituting a moving object behind a wall 12, a radar 14 is provided, which transmits continuous waves 16 and 18 through a summation device 20 to an antenna 22. Antenna 22 simultaneously projects the two waveforms at $f_1$ and $f_2$ as illustrated at 24 and 26 through wall 12, where they meet object 10 and are reflected backwardly as illustrated at 28 and 30. The phase difference between outgoing and incoming waveforms for each of the frequencies is detected as will be discussed, and in one embodiment the waveform corresponding to the temporal phase difference for tone $f_1$ is coupled to a predictor 32. It is the purpose of predictor 32 to predict the temporal waveform that would be expected to exist for the temporal phase difference waveform at frequency $f_2$ for an object at a known distance or range, with the output of the predictor being a waveform on line 34. In order for predictor 32 to operate, the predictor predicts the $f_2$ waveform for a predetermined range $R_x$ as illustrated at 36, such that for a given input waveform at one frequency, a set of templates at the other frequencies corresponding to predicted waveforms at different ranges constitutes the output of predictor 32.

Predictor 32, upon receiving a waveform input on input line 38, for an initial range generates a predicted waveform for the temporal phase difference for the second tone and applies this waveform to a comparator 40.

As illustrated by arrow 42, measured data in terms of the temporal phase difference waveform for tone $f_2$ is applied to a waveform generator 44. This provides a temporal rendition of the phase difference of the outgoing and incoming waves at frequency $f_2$ from measured data. This waveform is applied on line 46 to comparator 40.

If the waveform on line 34 and the waveform on line 46 are sufficiently similar or agree, then one declares that the range to object 10 is the range that has been loaded into predictor 32 to generate the predicted waveform. This range is outputted at 50 as illustrated.

On the other hand, if there is no significant agreement between the waveforms on lines 34 and 46, then as illustrated at unit 52, the range associated with the predictor 32 is changed and the process is iteratively carried out until there is a sufficient match between the waveforms on lines 34 and 46. When there is such a match, the range that was used in the predictor 32 is the declared range to the moving target.

Figure 2:
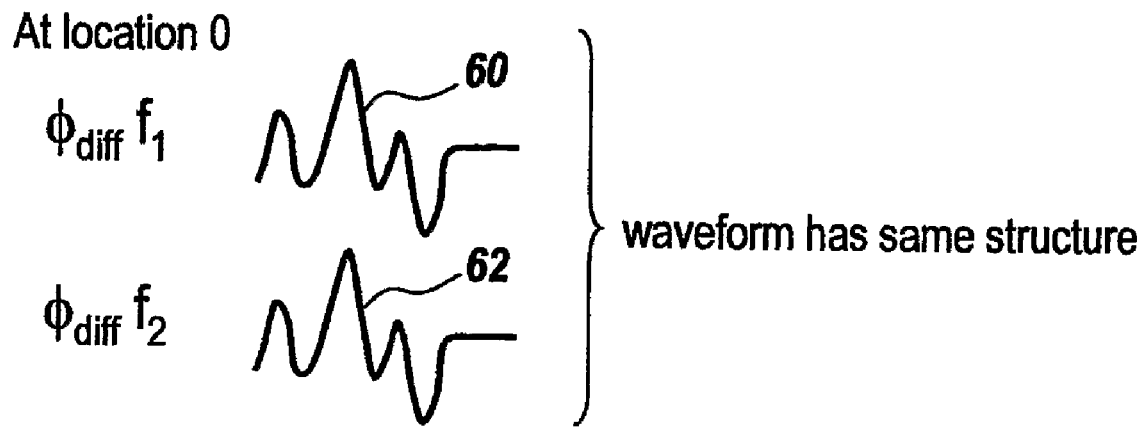
FIG. 2 is a waveform diagram for a pseudo-random moving object behind a wall, showing the phase difference waveforms for the two tones, namely $f_1$ and $f_2$, at a location that is adjacent the antenna of FIG. 1, showing the relative identity of the two waveforms.

Referring to FIG. 2, assuming that one has phase difference waveforms 60 and 62 that are the result of the radiation from antenna 22 impinging up a randomly moving object behind wall 12, then as can be seen, for a location that is adjacent antenna 22, namely at zero distance, the waveforms themselves are very nearly the same.

Figure 3:
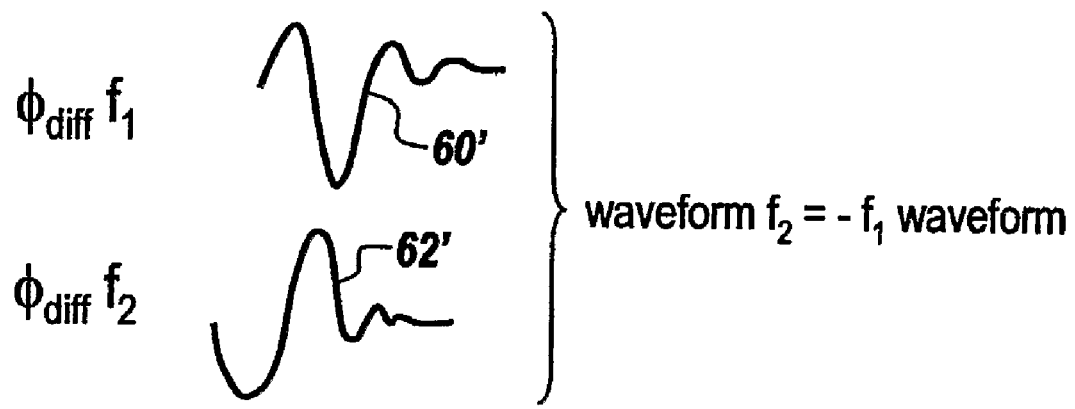
FIG. 3 is a waveform diagram for a pseudo-random moving object behind a wall, showing the phase difference waveforms for the two tones, namely $f_1$ and $f_2$, at a location at a distance from the antenna at which the waveforms are 180° out of phase.

Referring to FIG. 3, if the moving object creating the phase difference in the returns to antenna 22 is at a location that is $\lambda/4$, with $\lambda$ being the wavelength of the tone separation, in one embodiment one MHz, then waveforms 60 and 62 are those as shown as waveforms 60' and 62', which are 180° phase shifted. This means that even for pseudo-random motion that results in non-sinusoidal waveforms 60 and 62, one can nonetheless establish that the distance of the object that is moving in a pseudo-random fashion is at $\lambda/4$ away from antenna 22.

Referring to FIG. 4, for waveforms 60" and 62", these waveforms are those that result from a pseudo-random moving object at a range between zero and $\lambda/4$. If it were possible to measure the phase difference between these two non-sinusoidal waveforms, one could ascertain the distance from the antenna and therefore the range.

However, and referring back to FIG. 1, since it is not possible to accurately measure the phase shift of phase difference between waveforms 60" and 62", at least from inspection, one generates a series of waveform templates relating to one of the tones or frequencies that would be expected at one of a plurality of ranges. This waveform is predicted from the measured waveform of the other of the frequencies or tones, with the prediction algorithm being described above.

In this manner, one generates a series of waveform templates at one particular frequency or tone, which is what would be expected at various ranges. This is done by using the waveform associated with the other tone.

Having generated a series of such range-dependent templates, one then seeks to compare a waveform from measured data with the predicted waveform, which his range dependent. One can use any one of a number of curve-matching or best-fit techniques to ascertain to which of the waveform templates the measured data corresponds. When there is a sufficient match, one then declares the range to the moving object to be the range associated with the particular template to which the measured waveform was attached.

Figure 5:
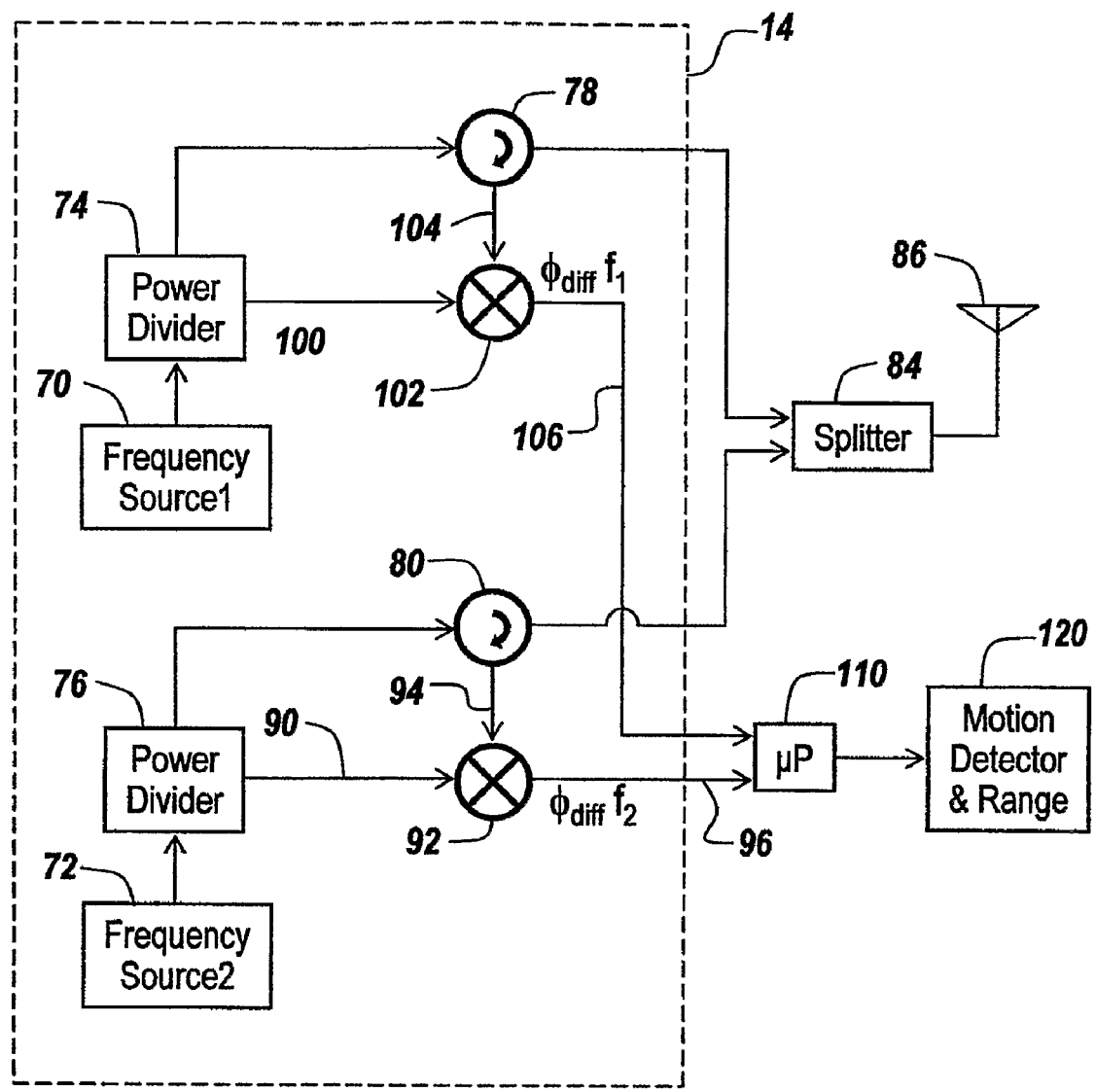
FIG. 5 is a block diagram of a two-tone CW radar for use in the subject invention in which phase difference of the outgoing and incoming signals for each of the two frequencies is detected as the output of respective mixers, with the outputs of the respective mixers being applied to a microprocessor for determining not only the presence of motion but also range to the moving object.

Referring to FIG. 5, apparatus for deriving the temporal phase difference waveforms is shown in terms of a dual frequency radar, although some advantage may be obtained by using more than two different frequencies. However, for the present purposes, radar 14 can be characterized as including a pair of frequency sources 70 and 72 respectively at $f_1$ and $f_2$, each of which driving a power divider respectively 74 and 76, the outputs of which are respectively coupled to circulators 78 and 80, the outputs of which are in turn coupled to a summing or mixing device such as a splitter 84 and thence to an antenna 86.

Power divider 76 provides an output along line 90 to a mixer 92, which mixes it with an output corresponding to the returned signal from a moving object that comes out on line 94. The output of mixer 92 along line 96 is therefore the phase difference between the outgoing and incoming signals at frequency $f_2$.

Likewise, for power divider 74, one output is applied over line 100 to a mixer 102, which has as its other input a signal on line 104 such that the output along line 106 from mixer 102 is a phase difference waveform associated with the phase difference between outgoing and incoming signals associated with $f_1$.

Microprocessor 110 performs the functions of detecting not only motion but the range to the object in motion as described above, with a motion detector and range-determining unit 120 outputting the range to the moving target, be it in continuous motion or pseudo-random motion.

It will be appreciated that microprocessor 110 contains the predictor, comparator and range adjustment functions that are described in connection with FIG. 1.

Figure 6:
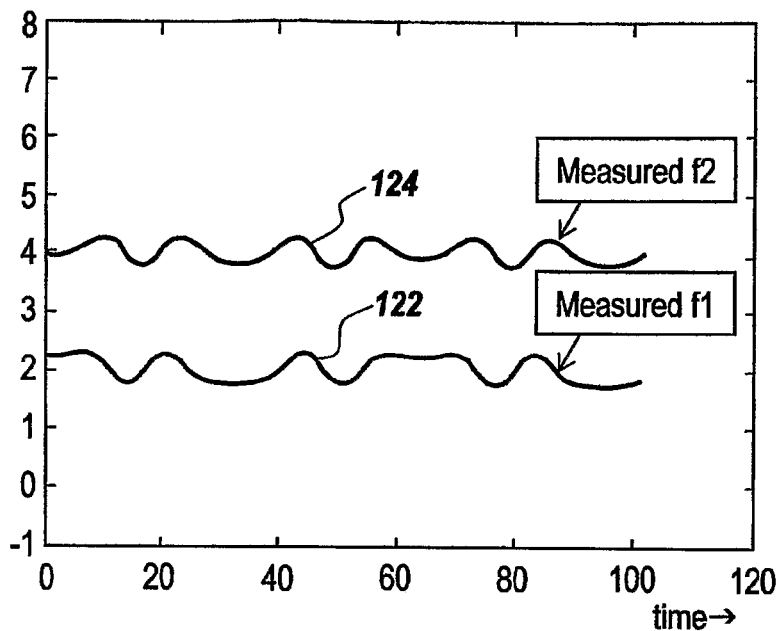
FIG. 6 is a waveform diagram of measured temporal phase differences for the two tones, $f_1$ and $f_2$, showing a difference in the two waveforms; and, FIG. 7 is a series of projected waveforms for the second of the two frequencies at eight different ranges, with the fifth of the predicted waveforms being the closest match to the measured $f_2$ waveform corresponding to a range of approximately 50-meters.

As illustrated in FIG. 6, the measured phase difference waveforms applied to unit 110 are illustrated at 122 for the first tone or $f_1$, and 124 for the second tone or $f_2$. Here it will be appreciated that for these signals, an object behind wall 12 has reflected the signals such that the phase difference waveforms can be generated. The range at which the object reflects the radar energy is not known and, as can be seen, the phase difference waveforms are slightly different one tone to the other.

Figure 7:
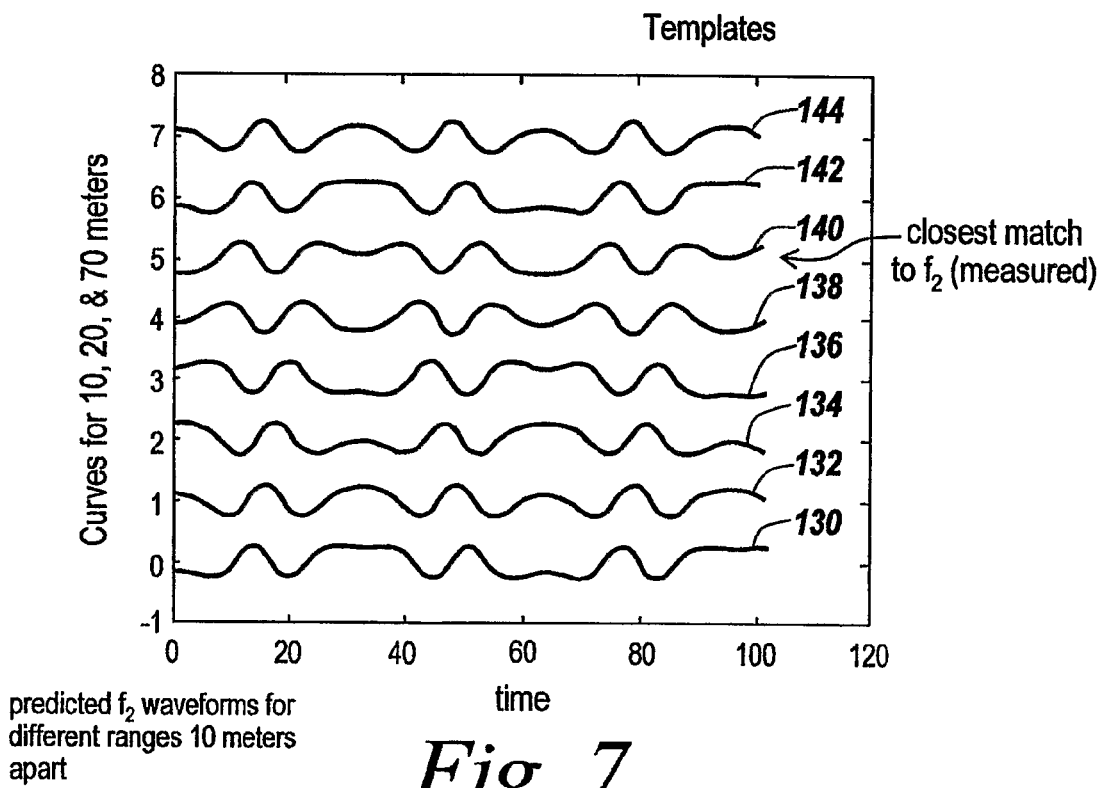

Referring to FIG. 7, a number of waveforms 130, 132, 134, 136, 138, 140, 142 and 144 constitute a number of templates, with these waveforms being the predicted $f_2$ waveforms for different ranges. In this case the ranges are separated by 10 meters.

If, as is done by unit 110, one compares the measured waveform at $f_2$, namely waveform 122, with each of these templates, one ascertains that the closest match to the measured $f_2$ waveform is waveform 140. This leads to the declaration that the range to the object is 50 meters.

What will be seen, even though the object in question may be exhibiting a pseudo-random motion, and even though this pseudo-random motion produces phase difference waveforms that are non-sinusoidal, one can nevertheless, with waveform matching techniques, determine which of the templates is closest to the measured waveform, whereby range to the object producing this waveform can be readily ascertained with high certainty.

It will be appreciated that if one has multiple two-tone radar units at different positions and if one establishes the range to each of these radars by the techniques described herein, one can establish the position of the moving object by triangulation or other techniques.

As mentioned hereinabove, in order to get an unambiguous range determination, one has to ascertain in which range cell the moving object is. This is simply accomplished by adjusting the frequency separation between the tones to establish a large enough range cell so that one with confidence can ascertain that the moving object is within the range cell. Also, as mentioned before, amplitude-sensitive techniques can determine which range cell the object is in, since the amplitude of returns from objects farther away will be considerably reduced.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A method for detecting range to a moving object, comprising the steps of:
    projecting continuous wave energy simultaneously at two different frequencies from a single antenna towards the moving object; and,
    estimating range from the antenna to the moving object based on the phase difference between outgoing and reflected waves of the two frequencies at the antenna, the phase difference between the outgoing and reflected waves being used to establish respective temporal waveforms in the estimating step, the range estimation based on the relative phase relationship between the temporal waveforms.

2. The method of claim 1, wherein the moving object is moving at a constant velocity.

3. The method of claim 1, wherein the moving object is moving at a non-constant velocity.

4. The method of claim 1, wherein the range estimation step includes the steps of providing a number of frequencies templates and generating for a first one of the frequencies templates of a number of temporal waveforms, each corresponding to a different range and comparing the waveform associated with the first frequency and derived from measured data with each of the templates, with a match establishing the range to the object, whereby the range to a non-uniformly-moving object can be estimated.

5. The method of claim 4, wherein the step of generating a template includes the steps of predicting from a waveform of the other of the frequencies the waveform of the first frequency that should exist at a given range and wherein the template to which the waveform corresponding to the measured data is compared is a predicted waveform.

6. The method of claim 5, wherein the compared waveforms are associated with the first frequency.

7. The method of claim 1, wherein the frequency separation between the two frequencies defines the range resolution, with smaller frequency separation resulting in increased resolution.

8. The method of claim 7, wherein the frequency separation determines the length of a range cell.

9. The method of claim 8, wherein the two frequencies are in the hundreds of megahertz band and wherein the frequency separation is at least one megahertz.

10. A method for estimating the range to a non-uniformly-moving object, comprising the steps of:

simultaneously projecting from a single antenna continuous wave energy simultaneously at two different frequencies towards the moving object which reflects incident wave energy back to the antenna; and, estimating the range to the non-uniformly-moving object based on the phase difference between outgoing and reflected waves of the two frequencies reflected by the object to the antenna, the range estimation step including the step of generating waveforms corresponding to the phase differences between outgoing and reflected waves, and further including from waveforms associated with a first one of said frequencies generating a set of range-dependent waveform templates corresponding to the second of the frequencies and comparing a waveform at the second frequency derived from measured data with each of the range-dependent waveform templates to ascertain by matching techniques which template is closest, and thus the estimated range to the non-uniformly-moving object.

11. Apparatus for the estimation of the range to a moving object, comprising:

a two-tone radar for generating continuous wave energy simultaneously at two different frequencies;

a single antenna coupled to said radar for simultaneously projecting continuous wave energy therefrom;

a pair of mixers coupled to said antenna and said radar for generating waveforms corresponding respectively to the phase difference between outgoing and reflected energy at said antenna for each of said two different frequencies; and, a range estimation unit coupled to said pair of mixers for estimating range to said moving object, said range estimation unit including a predictor for generating from a temporal waveform corresponding to the phase difference between outgoing and reflected energy at the second of said frequencies a series of range dependent waveforms corresponding to an expected temporal phase difference of returned continuous wave energy at a first one of said frequencies, and a waveform matching unit for establishing a match between one of said range-dependent waveforms and the output of the mixer associated with said first one of said frequencies.

12. The apparatus of claim 11, wherein said radar includes two frequency sources for generating continuous wave energy at said two frequencies, and means for coupling an output of each of said frequency sources to a respective mixer.

13. The apparatus of claim 11, wherein said radar is a microwave radar and wherein the frequency separation between said two frequencies is at least one megahertz.

14. The apparatus of claim 11 wherein said predictor has as one of its inputs the output of the mixer associated with the second of said frequencies.

* * * * *